(12) United States Patent
Adamini et al.

(10) Patent No.: US 7,125,042 B2
(45) Date of Patent: Oct. 24, 2006

(54) INFLATOR USING REVERSING AXIAL FLOW

(75) Inventors: Chris A. Adamini, Sterling Heights, MI (US); David S. Whang, Bloomfield Hills, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 122 days.

(21) Appl. No.: 10/811,253

(22) Filed: Mar. 25, 2004

(65) Prior Publication Data

US 2005/0212271 A1    Sep. 29, 2005

(51) Int. Cl.
*B60R 21/26* (2006.01)
(52) U.S. Cl. .................. 280/736; 280/741; 280/742
(58) Field of Classification Search ............... 280/736, 280/737, 740, 742, 741; 102/530, 200, 202
See application file for complete search history.

(56) References Cited

U.S. PATENT DOCUMENTS

| | | | | |
|---|---|---|---|---|
| 5,368,329 A | * | 11/1994 | Hock | 280/741 |
| 5,397,544 A | * | 3/1995 | Kobari et al. | 422/167 |
| 5,829,784 A | * | 11/1998 | Brown et al. | 280/737 |
| 5,851,030 A | * | 12/1998 | Johnson et al. | 280/741 |
| 5,907,120 A | * | 5/1999 | Mooney et al. | 102/521 |
| 6,036,226 A | * | 3/2000 | Brown et al. | 280/736 |
| 6,168,201 B1 | * | 1/2001 | Takeyama et al. | 280/737 |
| 6,328,336 B1 | * | 12/2001 | Takahashi et al. | 280/737 |
| RE37,843 E | * | 9/2002 | Blumenthal et al. | 280/737 |
| 6,454,299 B1 | * | 9/2002 | Whang et al. | 280/736 |
| 6,619,692 B1 | * | 9/2003 | Van Wynsberghe et al. | 280/741 |
| 6,796,581 B1 | * | 9/2004 | Karray et al. | 280/741 |

* cited by examiner

*Primary Examiner*—Paul N. Dickson
*Assistant Examiner*—Toan C. To
(74) *Attorney, Agent, or Firm*—L. C. Begin & Associates, PLLC

(57) ABSTRACT

An inflator (10) having an inflator body (12) with a plurality of elongate chambers (16, 18, 20, 22) and bores (17, 19, 21) formed therein. In a preferred embodiment, the bores (17, 19, 21) are formed in ends (12*a*, 12*b*) of the inflator body (12) and positioned co-radially with adjacent chambers, fluidly connecting the same and providing for a reversing axial flow in the inflator (10) for inflation gas.

23 Claims, 2 Drawing Sheets

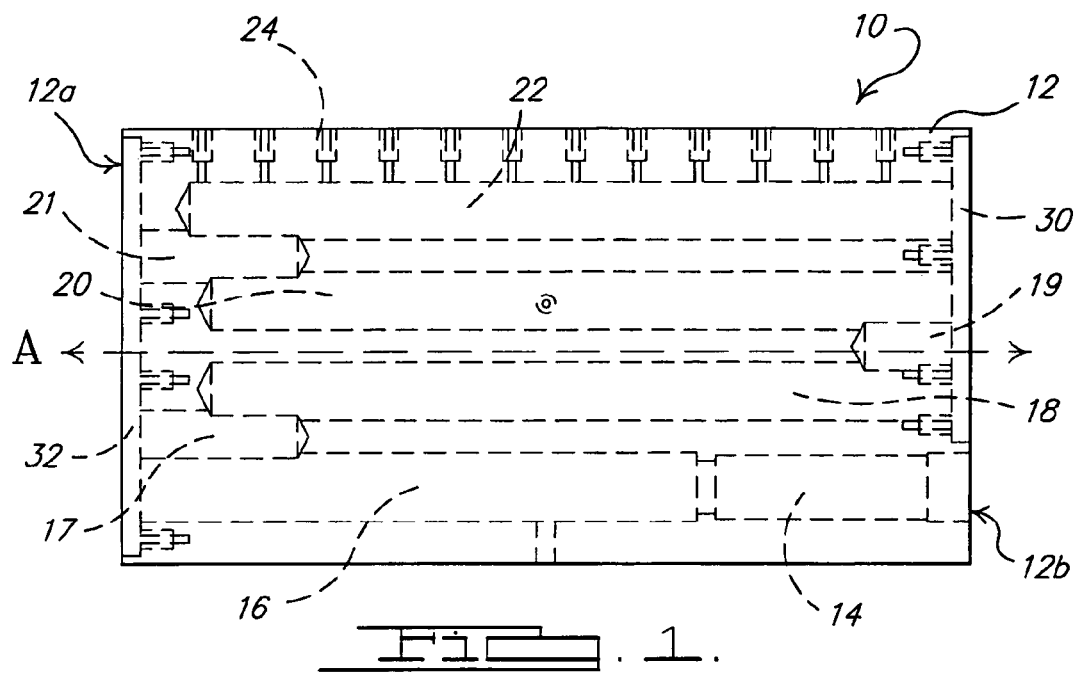
FIG. 1.
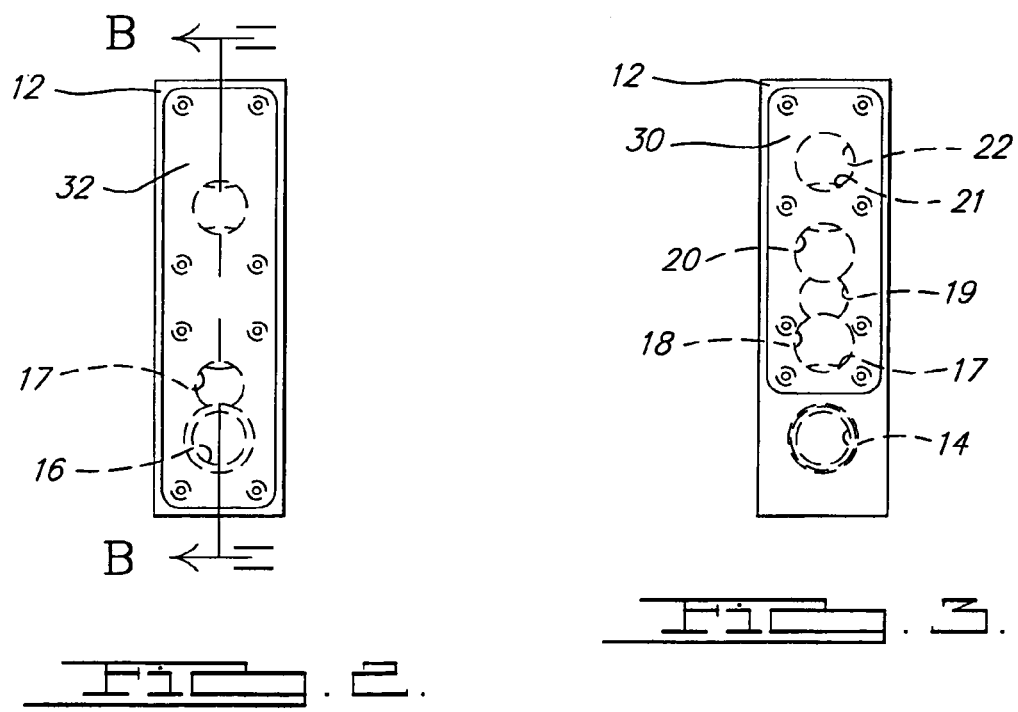
FIG. 2.
FIG. 3.

INFLATOR USING REVERSING AXIAL FLOW

TECHNICAL FIELD

The present invention relates generally to gas generators or inflators used in inflatable restraint systems in motor vehicles, and relates more particularly to such a device having a plurality of internal elongate chambers providing a reversing axial flow for inflation gas.

BACKGROUND OF THE INVENTION

Inflatable occupant restraint systems in motor vehicles typically utilize a gas generator or inflator to provide an inflation gas to an airbag, thereby cushioning a vehicle occupant in the event of a crash. A multitude of designs for such systems is known in the art. Generally, a pyrotechnic gas generant material is housed within a relatively robust metallic structure capable of withstanding the temperatures and forces associated with rapid combustion of the material and the associated gas production. Most gas generant materials used in these systems have an extremely rapid burn rate and, accordingly, it is often desirable to control the rate at which inflation gas is ejected from the inflator body. Rather than an extremely rapid output of hot gas, it is in some systems desirable to actually slow the burn rate of the gas generant material, or attenuate its ejection from the inflator body. Various filters, heat sinks and similar items are used in inflator systems to lower the temperature of the inflation gases, as well as to throttle back the gas output.

A related concern involves the chemical composition of the gas stream supplied to the airbag. With certain gas generant formulations, undesirable quantities of carbon monoxide and/or nitrogen compounds ($NO_x$) may be produced in relatively rapidly activating systems. The inflation gas is directed to the inflatable restraint device, and can ultimately end up in the passenger compartment of the vehicle. Because the proportions of these compounds can vary based on the response time and burn rate inside the inflator, attempts have been made to design inflator systems whereby a reduced amount of these gases is produced.

SUMMARY OF THE INVENTION

The present invention provides an inflator having an inflator body with a plurality of elongate chambers and bores formed therein. In a preferred embodiment, the bores are formed in ends of the inflator body and positioned co-radially with adjacent chambers, fluidly connecting the same.

In another aspect, the present invention provides a vehicle occupant protection system having an inflator with an inflator body wherein a plurality of elongate chambers and bores are preferably formed. In a preferred embodiment, the bores are formed in ends of the inflator body and positioned co-radially with adjacent chambers, fluidly connecting the same.

BRIEF DESCRIPTION OF THE DRAWINGS

FIG. 1 is a side view of an inflator according to a preferred embodiment of the present invention;

FIGS. 2 and 3 are opposite end views of the inflator of FIG. 1;

DETAILED DESCRIPTION

Figure 4:
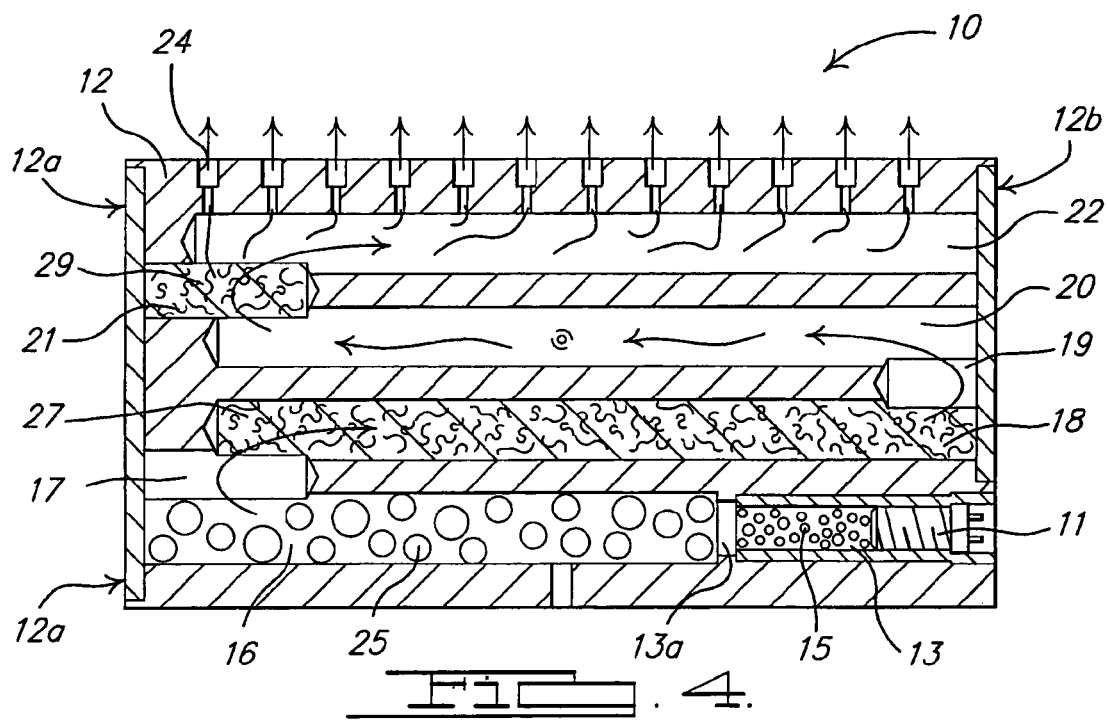
FIG. 4 is a sectioned side view of the inflator of FIGS. 1–3, taken along line B—B of FIG. 2.

Referring to FIGS. 1 and 2, there is shown an inflator 10 in accordance with a preferred constructed embodiment of the present invention. Inflator 10 includes an inflator body 12 that is preferably metallic, and may be formed by die casting or machining a metallic block. Inflator body 12 defines a longitudinal axis "A", and includes a plurality of elongate chambers formed therein. In particular, inflator body 12 preferably includes at least a first chamber 16, second chamber 18 and third chamber 20. A fourth chamber 22 is also preferably formed therein. In a preferred embodiment, all of the chambers extend substantially in parallel with longitudinal axis A. A plurality of apertures or inflation nozzles 24 are preferably longitudinally spaced along an edge of inflator body 12, and fluidly communicate with fourth chamber 22. Inflator 10 may be constructed of known materials and by known processes.

In a preferred embodiment, a plurality of bores 17, 19 and 21 are formed in inflator body 12 and serve to fluidly connect the respective chambers 16, 18, 20 and 22. A substantially continuous fluid flow path is provided beginning at chamber 16, connecting to chamber 18 via a first bore 17, thenceforth to chamber 20 via a second bore 19, to third chamber 22 via third bore 21, then finally through chamber 22 and past nozzles 24. In a preferred embodiment, the bores are formed such that they connect the respective chambers at alternating ends 12a (first end) and 12b (second end) of inflator body 12. Accordingly, the fluid flow path through inflator body 12 preferably reverses direction at each of bores 17, 19 and 21, providing for a reversing axially aligned fluid flow path.

First chamber 16 preferably includes a sub-chamber 14, within which a conventional igniter assembly 11, well known in the art, is positioned. In a preferred embodiment, a reinforcing insert 13 is positioned within and substantially complementary to sub-chamber 14. A quantity of gas generant material or booster propellant 15 is preferably placed in sub-chamber 14 and ignitable with igniter 11 in a conventional manner. Any suitable gas generant compound may be used, although non-azide compositions capable of producing readily filtered particulate slag are preferred. Exemplary but not limiting compositions are disclosed in U.S. Pat. Nos. 5,035,757, 5,872,329, 5,756,929, and 5,386,775, herein incorporated by reference. A frangible member or burst disk 13a preferably separates sub-chamber 14 from a main portion of chamber 16, and provides for a resident interim gas pressure in sub-chamber 14 during inflator activation, in a conventional manner. A main gas generant charge 25 is preferably positioned in chamber 16 and provides the main supply of inflation gas for the inflatable restraint system (not shown) of which inflator 10 is a part. A first filter 27, preferably a metallic mesh, wool or expanded metal, is preferably placed in second chamber 18, while a second filter 29, also preferably a metallic mesh, wool or expanded metal is preferably positioned in bore 21. Both of filters 27 and 29 remove particulate material produced during combustion of propellant charges 15 and 25, and serve as heat sinks for the inflation gas produced thereby. Embodiments are contemplated wherein the filters are placed at different locations in inflator body 12, or omitted altogether.

Referring also to FIGS. 2 and 3, first and second end plates 32 and 30 are preferably affixed to first and second ends 12a and 12b, respectively, of inflator body 12. In a preferred embodiment, plates 32 and 30 fluidly seal the ends of chambers 16, 18, 20 and 22 that are otherwise open at the ends of inflator body 12, as shown. Thus, first end plate 32 preferably extends across ends of first chamber 16, first bore 17, and third bore 21. Second end plate 30 preferably extends across ends of second chamber 18, second bore 19, third chamber 20 and fourth chamber 22. During construction, the various bores and chambers are formed in inflator body 12 from the ends 12a and 12b thereof. For example, first chamber 16 and third bore 21 preferably both comprise bore holes drilled from first end 12a of inflator body 12. Sub-chamber 14 is preferably formed with a bore hole from second end 12b, substantially coaxial with first chamber 16 and communicating therewith. Second chamber 18, second bore 19, third chamber 20 and fourth chamber 22 are likewise preferably formed by bore holes in second end 12b. Bores 17, 19 and 21 are preferably formed such that they are co-radial with both of the adjacent chambers, thereby providing fluid communications therebetween. FIGS. 2 and 3 illustrate the preferably co-radial relationship between the respective bores and chambers. Although the particular design described herein contemplates one preferred method of manufacturing inflator 10, the description should not be taken as limiting. For example, rather than the described structural design for the various boreholes and chambers, the bores and chambers need not be formed in the ends of inflator body 12 as described. The bores might all be drilled from one end of inflator body 12 while the chambers could all be drilled from the opposite end. Moreover, the chambers could be drilled completely through inflator body 12, and have both ends thereof sealed with plates 32 and 30.

When activation of inflator 10 is desired, an electrical activation signal is preferably sent from an onboard vehicle computer to igniter assembly 11. Igniter 11 then activates booster propellant 15 in sub-chamber 14 in a conventional manner. The rising gas pressure in sub-chamber 14 will burst member 13a, allowing a flame front to enter chamber 16 and ignite the main gas generant charge 25 therein. Combustion of main charge 25 will produce an inflation gas that traverses the described fluid flow path through the chambers and bores, preferably cooling and filtering as it passes through filters 27 and 29. Ultimately, the inflation gas will be ejected out of nozzles 24 from where it is directed into an inflatable occupant restraint device (not shown).

Figure 5:
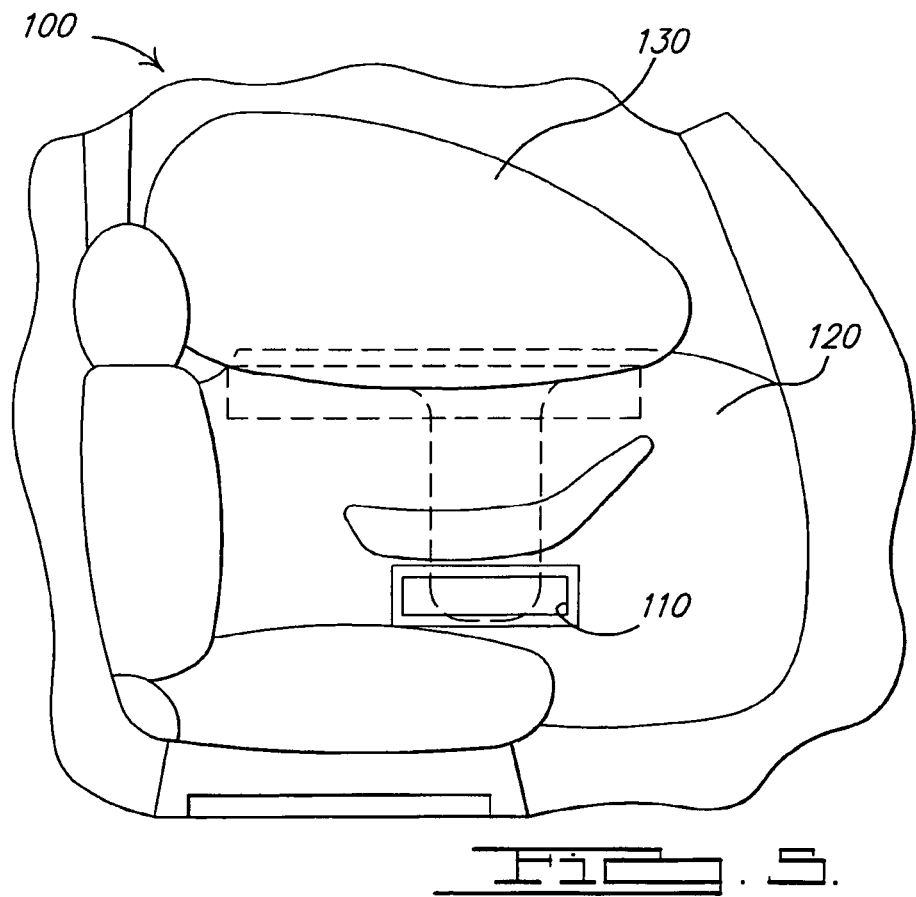
FIG. 5 is a schematic view of a vehicle occupant protection system in accordance with the present invention.

Turning to FIG. 5, there is shown a vehicle occupant protection system 100 in accordance with one preferred embodiment of the present invention. System 100 includes an airbag 130, deployable for example between a vehicle occupant and the side of a vehicle 120. An inflator (not shown), preferably an inflator similar to inflator 10 described herein, is preferably positioned in an airbag module 110. An exemplary, but not limiting module and vehicle occupant protection system suitable for use in accordance with the present invention is known from U.S. Pat. No. 6,398,294, herein incorporated by reference. When vehicle 120 experiences a sudden deceleration or collision, an electrical activation signal is sent to the inflator mounted in module 110. The signal activates the inflator, producing relatively rapid gas generation for inflating airbag 130. It should be appreciated that although a side impact system is described, the inflator embodiments described herein are applicable to vehicle occupant protection systems mounted in the vehicle dashboard, on the steering wheel, within the vehicle seat or anywhere else in the vehicle. Similarly, airbag modules incorporating inflators such as those described herein may be mounted at various locations within the vehicle.

The present invention provides a substantial advantage over many known inflator designs in that it is relatively simple in construction and easy to manufacture. Moreover, the axially reversing fluid flow path traversed by the inflation gas provides for an attenuated response of the inflator to an activation signal. Accordingly, the gas will take relatively longer to eject from inflator body 12, and will be cooled somewhat before doing so. By attenuating gas ejection, the content of the inflation gas will in many instances comprise relatively lower amounts of CO and $NO_x$ than in many known systems.

The present description is for illustrative purposes only and should not be construed to narrow the scope of the present invention in any way. Thus, those skilled in the art will appreciate that various modifications might be made to the presently disclosed embodiments without departing from the spirit and scope of the present invention. Other aspects, features and advantages will be apparent upon an examination of the attached drawing Figures and appended claims.

The invention claimed is:

1. An inflator for a vehicle occupant protection system comprising: an inflator body having first and second ends; a first elongate chamber formed in said body; a second elongate chamber formed in said body, said second chamber fluidly connected with said first chamber proximate said first end at a first connection; a third elongate chanter formed in said body, said third chamber fluidly connected with said second chamber proximate said second end at a second connection; a plurality of apertures spaced longitudinally along said inflator and fluidly communicating with said third elongate chamber; wherein said first, second and third chambers provide a substantially continuous fluid flow path through said inflator body, whereby a direction of said flow path is substantially reversed at least at each of said first and second connections.

2. The inflator of claim 1 comprising a fourth elongate chamber formed in said body, said fourth chamber fluidly connected with said third chamber proximate said first end at a third connection.

3. The inflator of claim 1 wherein said first chamber comprises a main chamber and a sub-chamber separated from said main chamber with a frangible member.

4. The inflator of claim 3 comprising an initiator assembly mounted at an end of said sub-chamber and adapted to ignite a propellant charge positioned therein.

5. The inflator of claim 2 wherein said first, second and third connections comprise bores formed in said inflator body and positioned in a radially overlapping fashion with the respective chambers fluidly connected by each said connection.

6. The inflator of claim 5 comprising a sealing plate extending across said first chamber, and said first and third connections.

7. The inflator of claim 6 comprising a sealing plate extending across said second chamber, said second connection, and said third and fourth chambers.

8. The inflator of claim 1 wherein said first, second and third chambers are substantially parallel.

9. The inflator of claim 1 wherein said inflator body comprises a substantially rectangular body having two parallel long edges and two substantially parallel short edges oriented perpendicular said long edges, wherein said flow path is oriented substantially parallel said long edges.

10. An inflator for an inflatable restraint system in a vehicle comprising: an inflator body; a first elongate chamber formed in said inflator body; a second elongate chamber formed in said inflator body; a third elongate chamber formed in said inflator body; a first bore overlapping radii of said first and second elongate chambers; a second bore overlapping radii of said second and third elongate chambers; a plurality of gas exit orifices in fluid communication with said third elongate chamber for supplying an inflation gas to an inflatable restraint device.

11. The inflator of claim 10 comprising a first cover plate attached to said inflator body, said cover plate extending over ends of said first elongate chamber and said first bore.

12. The inflator of claim 11 comprising a fourth elongate chamber formed in said inflator body and a third bore overlapping radii of said third elongate chamber and said fourth elongate chamber.

13. The inflator of claim 11 comprising a second cover plate attached to said inflator body, said second cover plate extending over ends of said second elongate chamber and said second bore.

14. The inflator of claim 13 comprising a fourth elongate chamber formed in said inflator body, said second cover plate extending over an end of said fourth elongate chamber.

15. A method of manufacturing an inflator for an inflatable occupant restraint system in a motor vehicle comprising the steps of: forming a first elongate chamber in an inflator body, the first elongate chamber oriented substantially parallel with a longitudinal axis thereof forming a second elongate chamber in the inflator body, the second elongate chamber oriented substantially parallel with the longitudinal axis; forming a third elongate chamber in the inflator body, the third elongate chamber oriented substantially parallel with the longitudinal axis; forming a first bore in a first end of the inflator body, wherein the bore overlaps radii of the first and second elongate chambers and fluidly connects the same; forming a second bore in a second end of the inflator body, wherein the second bore overlaps radii of the second and third elongate chambers and fluidly connects the same.

16. The method of claim 15 comprising the steps of: forming a fourth elongate chamber in the inflator body that is oriented substantially parallel with the longitudinal axis; and forming a third bore in the first end of the inflator body, wherein the third bore overlaps radii of the third and fourth elongate chambers and fluidly connects the same.

17. The method of claim 16 wherein the steps of forming the second, third and fourth elongate chambers comprise forming the chambers from one end of the inflator body.

18. The method of claim 17 wherein: the step of forming the first elongate chamber comprises forming the chamber completely through the inflator body such that it opens at first and second ends thereof, the steps of forming the first and third bores comprise forming the first and third bores from the first end of the inflator body; the steps of forming the second, third and fourth elongate chambers comprise forming the chambers from the second end of the inflator body; and the step of forming die second bore comprises forming the second bore from the first end of the inflator body.

19. An inflator manufactured according to the method of claim 16.

20. An inflator manufactured accenting to the method of claim 18.

21. An inflator for a vehicle occupant restraint system comprising: an inflator body; a first elongate chamber formed in said inflator body, a second elongate chamber formed in said inflator body; a first bore overlapping radii of said first and second elongate chambers, providing for fluid communication therebetween a plurality of gas exit orifices in fluid communication with said second elongate chamber for supplying an inflation gas to an inflatable restraint device.

22. An inflator according to claim 21 positioned in an airbag module.

23. An inflator according to claim 21 positioned in a vehicle occupant protection system.

* * * * *